US005107975A

United States Patent [19]

Iwata

[11] Patent Number: 5,107,975

[45] Date of Patent: Apr. 28, 1992

[54] CONTROL DEVICE FOR PASSENGER CONVEYOR

[75] Inventor: Akio Iwata, Inazawa, Japan

[73] Assignee: Mitsubishi Denki Kabushiki Kaisha, Japan

[21] Appl. No.: 554,889

[22] Filed: Jul. 20, 1990

[30] Foreign Application Priority Data

Jul. 31, 1989 [JP] Japan .................................. 1-198295

[51] Int. Cl.[5] .............................................. B65G 43/00

[52] U.S. Cl. ...................................................... 198/323

[58] Field of Search ......................................... 198/323

[56] References Cited

U.S. PATENT DOCUMENTS

| | | | |
|---|---|---|---|
| 3,580,376 | 5/1971 | Loshbough | 198/323 X |
| 4,139,810 | 2/1979 | Ueki et al. | 198/323 X |
| 4,151,381 | 4/1979 | Holuba | 198/323 X |

FOREIGN PATENT DOCUMENTS

| | | | |
|---|---|---|---|
| 2432928 | 1/1975 | Fed. Rep. of Germany | 198/323 |
| 0122590 | 9/1979 | Japan | 198/323 |
| 63-176288 | 7/1988 | Japan . | |
| 0388817 | 3/1933 | United Kingdom | 198/323 |

*Primary Examiner*—H. Grant Skaggs

*Assistant Examiner*—James R. Bidwell

*Attorney, Agent, or Firm*—Leydig, Voit & Mayer

[57] ABSTRACT

A control device for a passenger conveyor includes an upward moving device for moving the passenger conveyor upward, a downward moving device for moving the passenger conveyor downward, a detection device of detecting an anomaly of the movement of the passenger conveyor, an emergency stopping device for stopping the movement of the passenger conveyor by emergency stopping either the upward moving device or the downward moving device which is operated when the detection device detects an anomaly, a control device for operating the other of the upward moving device and the downward moving device after the emergency stopping device stops the passenger conveyor to forcibly move the passenger conveyor in a direction opposite to that in which it is moving before it is stopped, and a forcible operation stopping device for stopping the forcible movement of the passenger conveyor when the detection device is reset due to the passenger conveyor being forcibly moved by the control device.

5 Claims, 1 Drawing Sheet

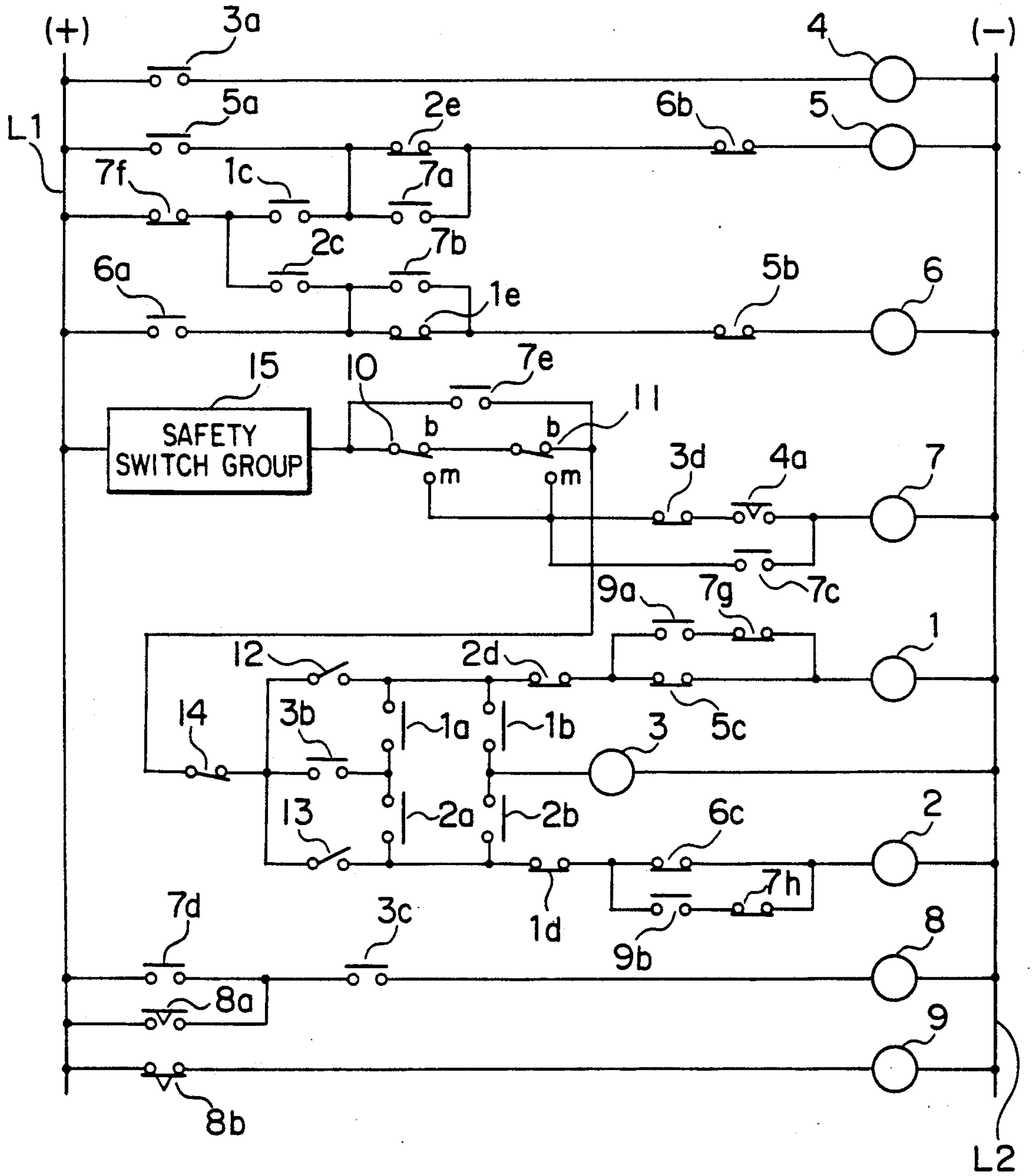
(+)
(-)
3a
4
5a
2e
6b
5
L1
7f
1c
7a
2c
7b
6a
5b
6
1e
15
10
7e
11
SAFETY SWITCH GROUP
b
b
m
m
3d
4a
7
7c
9a
7g
1
12
2d
14
3b
1a
1b
3
5c
13
2a
2b
6c
2
7h
7d
3c
1d
9b
8
8a
9
8b
L2

CONTROL DEVICE FOR PASSENGER CONVEYOR

BACKGROUND OF THE INVENTION

1. Field of the Invention

The present invention relates to a control device for a passenger conveyor, and more particularly, to a control device for a passenger conveyor which assures security by automatically stopping the passenger conveyor when foreign matter is caught between a skirt guard and a step or between a cleat of the adjacent steps and a riser.

2. Description of the Related Art

Passenger conveyors of the type which stop for an emergency when a passenger's shoe or the like is caught between a step and a skirt guard of the passenger conveyor are disclosed in, for example, Japanese Patent Laid-Open No. 176288/1988.

Control devices for such passenger conveyors have a safety switch which is activated when foreign matter is caught between a step and a skirt guard provided at each of the right and left outer sides of the step, or a safety switch which activates when a rear roller of a rear step floats up due to a shoe or the like being caught between the cleat of the adjacent steps and a riser. When these safety switches are activated, the control devices stop the passenger conveyor for the emergency, thereby preventing the passenger's foot or the like from being hurt and assuring the safety of the passengers.

Before the operation of a passenger conveyor which has stopped due to an emergency is resumed, the cause of the emergency stop, i.e., the foreign matter, such as a shoe, caught between the skirt guard and the step, must be removed. At that time, in a case where the foreign matter cannot be pulled out, the passenger conveyor must be disassembled or be moved in the direction opposite to that in which it was moving when the foreign matter was caught by manually operating a driving unit housed in a machine room.

However, in the conventional passenger conveyors of the above-described type, since the foreign matter caught between the skirt guard and the step must be removed by either disassembling the passenger conveyor or by manually moving the step when the passenger conveyor is to be returned to its normal operation, it takes time to remove the cause, and removal operation is complicated. Hence, in a case where a passenger's foot is caught, it takes time to rescue the passenger, and this may cause further injury.

SUMMARY OF THE INVENTION

The present invention is directed to eliminating the aforementioned drawbacks of the conventional passenger conveyor, and has an object of providing a control device for a passenger conveyor in which, when the operation of the passenger conveyor is stopped in an emergency due to foreign matter being caught between a skirt guard and a step or between a cleat of adjacent steps and a riser, the foreign matter can be removed by forcibly moving the passenger conveyor in an opposite direction, and in which a detection means can be easily reset in a short period of time.

A control device of a passenger conveyor according to the present invention includes an upward moving means for moving the passenger conveyor upward, a downward moving means for moving the passenger conveyor downward, a detection means for detecting an anomaly of the movement of the passenger conveyor, an emergency stopping means for stopping the movement of the passenger conveyor by emergency stopping either the upward moving means or the downward moving means, which is operated when the detection means detects an anomaly, a control means for operating the other of the upward moving means and the downward moving means after the emergency stopping means stops the passenger conveyor to forcibly move the passenger conveyor in a direction opposite to that in which it is moving before it is stopped, and a forcible operation stopping means for stopping the forcible movement of the passenger conveyor when the detection means is reset due to the forcible movement of the passenger conveyor by the control means.

BRIEF DESCRIPTION OF THE DRAWING

The sole figure is a circuit diagram of a control device for a passenger conveyor according to the present invention.

DESCRIPTION OF THE PREFERRED EMBODIMENT

Referring to the sole figure, an upward electromagnetic switch 1 is a switch energized to move a passenger conveyor (not shown) upward, and has normally open contacts 1*a*, 1*b* and 1*c* and normally closed contacts 1*d* and 1*e*. A downward electromagnetic switch 2 is a switch energized to move the passenger conveyor downward, and has normally open contacts 2*a*, 2*b* and 2*c* and normally closed contacts 2*d* and 2*e*. A passenger conveyor operating relay 3 has normally open contacts 3*a*, 3*b* and 3*c* and a normally closed contact 3*d*. An operation timer 4 is kept operated for a predetermined period of time after the passenger conveyor has ceased, and has a normally open contact 4*a*.

An upward memory relay 5 holds in memory that the passenger conveyor is moving upward, and has a normally open contact 5*a* which makes the relay self-maintained and normally closed contacts 5*b* and 5*c*. A downward memory relay 6 is a relay which holds in memory that the passenger conveyor is moving downward, and has a normally open contact 6*a* which makes the relay self-maintained and normally closed contacts 6*b* and 6*c*. A safety switch operating relay 7 is energized when a safety switch is activated, and has normally open contacts 7*a* to 7*e* and normally closed contacts, 7*f*, 7*g* and 7*h*. A reverse operation timer 8 is operated for a predetermined period of time when the passenger conveyor is forcibly operated in a reverse direction, and has a normally open contact 8*a* and a normally closed contact 8*b*. A reverse operation managing relay 9 is activated to make the passenger conveyor movable upward or downward after the operation of the reverse operation timer 8 has ceased, and has a normally open contact 9*a* and a normally closed contact 9*b*.

Interconnections between the electromagnetic switches 1 and 2, the timers 4 and 8 and the relays 3, 5, 6, 7 and 9 will be described below.

The upward electromagnetic switch 1 is connected between d.c. power lines L1 and L2 through a safety switch group 15, a break contact of a detection switch 10 for detecting a foreign matter caught between the skirt guide and the step, a break contact of a switch 11 for detecting the floating of a rear wheel of the step, an operation stopping switch 14, an upward moving switch 12, the normally closed contact 2*d* of the downward electromagnetic switch 2 and the normally closed contact 5c of the upward memory relay 5. A series combination of the normally open contact 9a of the reverse operation managing relay 9 and the normally closed contact 7g of the safety switch operating relay 7 is connected in parallel to the normally closed contact 5c. A series combination of the normally open contact 3b of the operation relay 3 and the self-maintaining normally open contact 1a is connected in parallel to the upward moving switch 12.

The downward electromagnetic switch 2 is connected between the d.c. power lines L1 and L2 through a safety switch group 15, the break contact of the detection switch 10, the break contact of the switch 11, the operation stopping switch 14, a downward moving switch 13, the normally closed contact 1d of the upward electromagnetic switch 1 and the normally closed contact 6c of the downward memory relay 6. A series combination of the normally closed contact 9b of the reverse operation managing relay 9 and the normally closed contact 7h of the safety switch operating relay 7 is connected in parallel to the normally closed contact 6c. A series combination of the normally open contact 3b of the operation relay 3 and the self-maintaining normally open contact 2a is connected in parallel to the downward moving switch 13.

One end of the operation relay 3 is connected to either a junction between the upward moving switch 12 and the normally closed contact 2d or a junction between the downward moving switch 13 and the normally closed contact 1d through either the normally open contact 1b of the upward electromagnetic switch 1 or the normally open contact 2b of the downward electromagnetic switch 2, and the other end of the operation relay 3 is connected to the d.c. power line L2.

The operation timer 4 is connected between the d.c. power lines L1 and L2 through the normally open contact 3a of the operation switch 3.

The upward memory relay 5 is connected between the d.c. power lines L1 and L2 through the self-maintaining normally open contact 5a, the normally closed contact 2e of the downward electromagnetic switch 2 and the normally closed contact 6b of the downward memory relay 6. A series combination of the normally closed contact 7f of the safety switch operating relay 7 and the normally open contact 1c of the upward electromagnetic switch 1 is connected in parallel to the normally open contact 5a. The normally open contact 7a of the safety switch operating relay 7 is connected in parallel to the normally closed contact 2e.

The downward memory relay 6 is connected between the d.c. power lines L1 and L2 through the self-maintaining normally open contact 6a, the normally closed contact 1e of the upward electromagnetic switch 1, and the normally closed contact 5b of the upward memory relay 5. A junction between the normally open contact 6a and the normally closed contact 1e is connected through the normally open contact 2c of the downward electromagnetic switch 2 to a junction between the normally open contact 7f and the contact 1c. The normally open contact 7b of the safety switch operating relay 7 is connected in parallel to the normally closed contact 1e.

One end of the safety switch operating relay 7 is connected to the make contacts of the detection switches 10 and 11 through the normally closed contact 3d of the operation relay 3 and the normally open contact 4a of the operation timer 4, and the other end thereof is connected to the d.c. power line L2. The self-maintaining normally open contact 7c is connected in parallel to a series combination of the normally closed contact 3d and the normally open contact 4a.

The reverse operation timer 8 is connected between the d.c. power lines L1 and L2 through the normally open contact 7d of the safety switch operating relay 7 and the normally open contact 3c of the operating relay 3. The self-maintaining normally open contact 8a is connected in parallel to the normally open contact 7d.

The reverse operation managing relay 9 is connected between the d.c. power lines L1 and L2 through the normally closed contact 8b of the reverse operation timer 8.

The operation of the control device arranged in the manner described above will now be described.

In a normal operation of the passenger conveyor, since the safety switch operation relay 7 and the reverse operation timer 8 are in a de-energized state, the reverse operation managing relay 9 is in an energized state due to a closed circuit formed by the power line L1, the contact 8b, the relay 9 and the power line L2, and the contact 9a is closed.

In that state, when the upward operating switch 12 is turned on, a circuit formed by the power line L1, the switch group 15, the switches 10, 11, 14 and 12, the contacts 2d, 9a and 7g, the electromagnetic switch 1 and the power line L2 is closed, and the upward electromagnetic switch 1 is thus energized. When the upward electromagnetic switch 1 is energized, its normally open contact 1b is closed, and the operation relay 3 is thus energized. Closing of the normally open contacts 3b, 1a and 1b makes the upward electromagnetic switch 1 and the operation relay 3 self-maintained.

Energization of the upward electromagnetic switch 1 activates a passenger conveyor driving device and releases an electromagnetic brake (not shown), and the passenger conveyor is thereby driven and moved upward.

When the operation relay 3 is energized, its normally open contact 3a is closed, and the operation timer 4 is thus energized due to a closed circuit formed by the power line L1, the contact 3a, the timer 4 and the power line L2. Also, when the upward electromagnetic switch 1 is energized, its normally open contact 1c is closed, and the upward memory relay 5 is thus energized due to a closed circuit formed by the power line L1, the contacts, 7f, 1c, 2e and 6b, the relay 5 and the power line L2. Energization of the memory relay 5 closes its normally open contact 5a. As a result, the relay 5 is self-maintained and thereby memorizes the upward operation of the passenger conveyor. Energization of the memory relay 5 opens its normally closed contact 5b, and this interlocks the downward memory relay 6. Also, when the upward electromagnetic switch 1 is energized, its normally closed contact 1d is opened, and the downward electromagnetic switch 2 is thus interlocked.

During the upward movement of the passenger conveyor, when a foreign matter, such as a passenger's shoe, is caught between the skirt guard and the step, the detection switch 10 is activated and is thus switched over to the make contact m. Concurrently with this, the closed circuit of the upward electromagnetic switch 1 is opened and the upward electromagnetic switch 1 is thus de-energized, de-energizing a driving motor and the electromagnetic brake (not shown). As a result, the brake is operated and the passenger conveyor is thereby braked and stopped for the emergency.

When the upward electromagnetic switch 1 is de-energized, its normally open contacts 1*a* and 1*b* are opened, de-energizing the operation relay 3 and the operation timer 4. At that time, since the normally open contact 4*a* of the operation timer 4 is maintained closed for a fixed period of time and the normally closed contact 3*d* of the operation relay 3 is closed, the safety switch operating relay 7 is energized due to a closed circuit formed through the power line L1, the switch group 15, the detection switch 10, the contacts 3*d* and 4*a*, the relay 7 and the power line L2. Energization of the safety switch operating relay 7 closes its normally open contact 7*c*, and this makes the relay 7 self-maintained. Hence, the safety switch operating relay 7 is kept energized even when the normally open contact 4*a* is opened after the fixed period of time has elapsed.

When the safety switch operating relay 7 is energized, its normally closed contact 7*f* is opened and its normally open contact 7*a* is closed. As a result, a circuit formed through the power line L1, the contacts 5*a*, 7*a* and 6*b*, the relay 5, and the power line L2 is closed, and the upward memory relay 5 is thus kept energized. At that time, even if the upward moving switch 12 is turned on to forcibly move the passenger conveyor, since the normally closed contacts 5*c* and 7*g* are open, the upward electromagnetic switch 1 cannot be energized. In that state, when the downward moving switch 13 is turned on, a circuit formed through the power line L1, the switch group 15, the contact 7*e*, the switches 14 and 13, the contacts 1*d* and 6*c*, the electromagnetic switch 2 and the power line L2 is closed, and the downward electromagnetic switch 2 is thus energized. As a result, the electromagnetic brake (not shown) is released and the driving motor is activated to move the passenger conveyor downward.

When the downward electromagnetic switch 2 is energized, its normally open contact 2*b* is closed. As a result, a closed circuit is formed through the power line L1, the switch group 15, the contact 7*e*, the switches 14 and 13, the contact 2*b*, the relay 3 and the power line L2, and the operation relay 3 is thus energized. When the downward electromagnetic switch 2 and the operation relay 3 are energized, the normally open contacts 2*a* and 3*b* are closed, and the downward electromagnetic switch 2 and the operation relay 3 are thereby self-maintained. Also, when the operating relay 3 is energized, its normally open contact 3*c* is closed. As a result, a closed circuit is formed through the power line L1, the contacts 7*d* and 3*c*, the timer 8 and the power line L2, and the reverse operation timer 8 is thus energized. When the reverse operation timer 8 is energized, its normally open contact 8*a* is closed, and the timer 8 is thereby self-maintained. Also, when the reverse operation timer 8 is energized, its normally closed contact 8*b* is opened. The contact 8*b* remains open for a fixed period of time after the opening, and the reverse operation managing relay 9 is thereby de-energized.

Once the passenger conveyor has been forcibly moved in a reverse direction, the foreign matter caught between the skirt guard and the step may be removed. This returns the skirt guard to its original position and thus returns the detection switch 10 to its original position. That is, the detection switch 10 is switched over to the brake contact b, and the safety switch operation relay 7 is thereby de-energized. When the safety switch operation relay 7 is de-energized, its normally open contact 7*a* is opened, and the upward memory relay 5 is thereby de-energized. At that time, the normally closed contact 5*b* is closed. As a result, a closed circuit is formed through the power line L1, the contacts 7*f*, 2*c*, 1*e* and 5*b*, the relay 6, and the power line L2, and the downward memory relay 6 is thus energized. When the downward memory relay 6 is energized, its normally closed contact 6*c* is opened. At that time, since the normally open contact 9*b* is also open, the downward electromagnetic switch 2 is de-energized, stopping the movement of the passenger conveyor and de-energizing the operation relay 3. When the operation relay 3 is de-energized, its normally open contact 3*c* is opened, and the reverse operation timer 8 is thereby de-energized. When the contact 8*b* of the reverse operation timer 8 is closed a fixed period of time after the timer 8 has been de-energized, the reverse operation managing relay 9 is energized, and its normally open contacts 9*a* and 9*b* are thereby closed. As a result, the upward and downward electromagnetic switches 1 and 2 are made energizeable.

When the foreign matter is caught between the skirt guard and the step during the downward movement of the passenger conveyor and the detection switch 10 is thereby switched over to the make contact m, or when the rear roller of the rear step floats up due to the foreign matter caught between the cleat of the adjacent steps and the riser and the detection switch 11 is thereby switched over to the make contact m, the downward electromagnetic switch 2 is de-energized in a similar manner as that in which the upward electromagnetic switch 1 is de-energized, and the passenger conveyor is thereby stopped for the emergency. Thereafter, the passenger conveyor is moved in the opposite direction by manually turning on the upward moving switch 12. When the foreign matter is removed, the detection switch 10 or 11 returns to its original position, by means of which the upward movement of the passenger conveyor is automatically stopped.

As will be understood from the foregoing description, according to the present invention, when the operation of the passenger conveyor is stopped in an emergency due to a foreign matter caught between the skirt guard and the step or floating of the step, the passenger conveyor is manually moved in the direction opposite to that in which the foreign matter is caught and the anomaly is then eliminated, by which the passenger conveyor is automatically stopped. In consequence, in an emergency case such as that in which a passenger's foot is caught between the skirt guard and the step, a rescue operation can be conducted quickly, and a conventionally required complicated work, including disassembly of the passenger conveyor and manual movement of the step, can be eliminated.

The control device according to the present invention is not limited to the above-described relay type circuit configuration.

What is claimed is:

1. A control device for a passenger conveyor comprising:

a powered upward moving means for moving the passenger conveyor upward including a circuit having an up switch which causes said powered upward moving means to be energized when manually actuated, a powered downward moving means for moving the passenger conveyor downward including a circuit having a down switch which causes said powered downward moving means to be energized when manually actuated;

said up switch and said down switch being separate and independently manually actuable;

a detection means for detecting an anomaly of the movement of the passenger conveyor when said detection means is actuated during movement of the conveyor in one direction by one of said powered moving means;

an emergency stopping means for stopping movement of the passenger conveyor in the one direction by emergency stopping said one powered moving means in response to detection of an anomaly by said detection means, said emergency stopping means including safety circuit means which prevents energization of the one powered moving means after said anomaly detection means has been actuated to prevent moving the passenger conveyor in the same direction;

a control means for energizing the other of said powered upward moving means and said powered downward moving means in response to manual actuation of one of said up switch and said down switch after said emergency stopping means stops said passenger conveyor to provide powered movement of said passenger conveyor in a reverse direction opposite to the one direction in which it is moving before it is stopped; and a reverse operation stopping means for automatically stopping the powered movement of the passenger conveyor in the reverse direction when said detection means is reset upon removal of the cause of the anomaly.

2. A control device according to claim 1, wherein said detection means detects foreign matter caught between a skirt guard and a step of the passenger conveyor.

3. A control device according to claim 1, wherein said detection means detects floating of a step of said passenger conveyor.

4. A control device according to claim 1, wherein said emergency stopping means includes an upward memory means for memorizing that said upward moving means is operating and a downward memory means for memorizing that said downward moving means is operating.

5. A control device according to claim 1 including timer operated means operated when said detection means is reset so that either said upward moving means or said downward moving means may be manually actuated to restart the passenger conveyor only after a predetermined time determined by said timer operated means following reset of said detection means.

* * * * *